United States Patent [19]

Burdette et al.

[11] Patent Number: 4,729,317

[45] Date of Patent: Mar. 8, 1988

[54] CONCENTRIC LAYER RAMJET FUEL

[75] Inventors: George W. Burdette; John P. Francis, both of Ridgecrest, Calif.

[73] Assignee: The United States of America as represented by the Secretary of the Navy, Washington, D.C.

[21] Appl. No.: 938,922

[22] Filed: Dec. 8, 1986

[51] Int. Cl.⁴ .............................................. C06D 5/06
[52] U.S. Cl. ..................... 102/287; 102/291; 102/292; 60/253; 149/19.9
[58] Field of Search ............. 102/286, 287, 289, 290, 102/291, 292; 264/3.1, 3.3; 149/19.4, 19.8, 19.9; 60/253

[56] References Cited

U.S. PATENT DOCUMENTS

| | | | |
|---|---|---|---|
| 1,074,809 | 10/1913 | Newton | 102/286 |
| 3,002,459 | 10/1961 | Harper | 102/287 |
| 3,285,012 | 11/1966 | Larue | 102/287 |
| 3,585,799 | 6/1971 | Geschwentner | 60/253 |
| 3,649,389 | 3/1972 | Barron | 102/291 X |
| 3,677,010 | 7/1972 | Fink | 102/288 |
| 3,687,746 | 8/1972 | Bieber et al. | 102/291 X |
| 3,918,365 | 11/1975 | Arribat | 102/287 |
| 3,926,697 | 12/1975 | Humbert | 102/288 |
| 3,951,072 | 4/1976 | Baker | 102/291 |
| 3,969,166 | 7/1976 | Sayles | 149/19.9 X |
| 3,979,236 | 9/1976 | Sayles | 149/19.8 |
| 4,116,131 | 9/1978 | Shafer et al. | 149/19.4 X |
| 4,137,286 | 1/1979 | Bornstein | 264/3.1 |
| 4,357,795 | 11/1982 | Bastian et al. | 60/245 X |
| 4,429,634 | 2/1984 | Byrd et al. | 102/290 |

Primary Examiner—Peter A. Nelson
Attorney, Agent, or Firm—William C. Townsend; W. Thom Skeer; Karl Vincent Sidor

[57] ABSTRACT

An air-breathing solid fuel rocket motor containing a solid fuel ramjet grain having a plurality of concentric layers of solid fuel which provide a means of controlling the thrust of the motor.

5 Claims, 3 Drawing Figures

CONCENTRIC LAYER RAMJET FUEL

BACKGROUND OF THE INVENTION

1. Field of the Invention

This invention relates to air-breathing solid fuel rocket motors. More particularly, this invention relates to solid fuel ramjet grains having a plurality of concentric layers of solid ramjet fuel. Even more particularly, this invention relates to a method of controlling thrust in a solid fuel ramjet.

2. Description of the Prior Art

It is well known to vary the thrust of solid composite rocket motors by using multiple concentric layers of propellants. The propellants in these rocket motors contain sufficient oxidizers to support complete combustion without additional air. It is possible to vary the thrust of the solid composite rocket motor by varying the combustion properties for each concentric layer of propellant.

It is also known to use multilayer propellant designs with an inert liner material between the layers which has insufficient incorporated oxidizer to support combustion. After the initial layer of propellant material burns through, the rocket ceases to function. However, if additional impulse is needed to extend the range of the rocket, an oxidizer fluid which is hypergolic with the liner is injected into the chamber igniting the liner which after burning through, ignites the adjacent layer of propellant.

The two previously described systems which use multilayer propellant arrangements operate in a different manner from air-breathing solid fuel rocket motors because prior art solid composite rocket motors contain sufficient oxidizers to support complete combustion. As a result, complete combustion occurs in an area partially defined by the surface of the propellant grain. On the other hand, the solid fuel of air-breathing solid fuel rocket motors undergoes combustion only after mixing with air ingested from the atmosphere. Combustion occurs at the fuel grain surface and in combustion after chamber to produce thrust.

Existing solid fuel ramjet motors utilize one fuel of a homogeneous compostion which burns to produce a relatively constant thrust until burn-out. The limitation with single-fuel ramjet systems is that such systems are only able to produce a single level of thrust.

Previous methods of controlling the thrust produced by air-breathing solid fuel rocket motors operated by controlling the flow of ram-air to the engine. These methods have had limited success because they interfere with the stability of air flow into the motor necessary for proper operation of an air-breathing rocket motor. As a result, it is extremely difficult to throttle a solid fuelled air breathing system. The present invention provides a passive form of throttling without affecting the air flow.

SUMMARY OF THE INVENTION

One object of this invention is to produce a solid fuel ramjet grain comprising a plurality of concentric layers of solid ramjet fuel.

Another object of this invention is to provide a method for controlling the thrust of a solid fuel ramjet (air-breathing rocket).

According to the present invention, a solid fuel ramjet grain is cast having a plurality of concentric layers of solid ramjet fuel around a perforation along the center axis of the grain such that, when burned in the operation of the ramjet, each fuel layer will produce a different level of thrust. The invention is also directed to a method of controlling the thrust of a solid fuel ramjet motor having multiple concentric layers of solid ramjet fuel. The method encompasses the steps of igniting and combusting the outermost layer of solid fuel to produce thrust for the operation of the ramjet until the adjacent layer is exposed; and then combusting the adjacent layer of solid fuel having different combustion properties to produce a different level of thrust. These steps are repeated until the remaining solid fuel layers have been consumed.

DETAILED DESCRIPTION OF THE INVENTION

Figure 1:
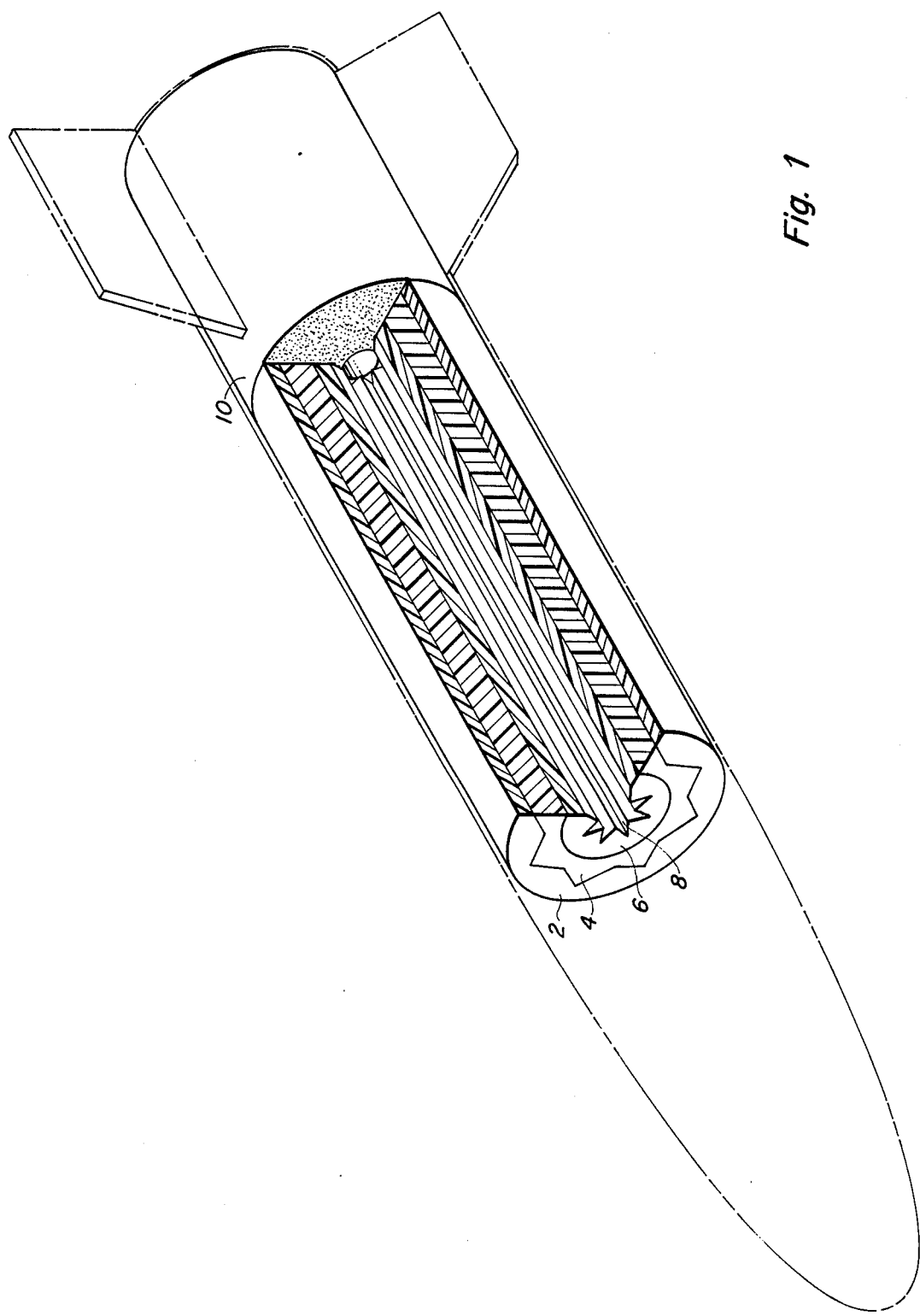
FIG. 1 is a perspective of the multilayer solid fuel ramjet engine according to the invention.

Referring to FIG. 1, the solid fuel ramjet grain comprises inner layer of fuel 2, outer layer of fuel 4, solid composite rocket propellant booster charge 6, and perforation 8 therethrough along the center axis of the grain. Booster charge 6 extends into and fills up combustion after chamber 10 except for perforation 15.

According to the invention, a fuse device (not shown) ignites booster charge 6 to provide an initial thrust. After booster charge 6 burns through, a port cover (not shown) opens and solid ramjet fuel outer layer 4 ignites causing the solid fuel motor to begin operating as a ramjet. Outer fuel layer 4 burns at the fuel surface and in combustion afterchamber 10 to provide thrust. After the outer fuel layer 4 burns through, solid ramjet fuel inner layer 2 ignites providing more thrust. Additional fuel layers may be used. These additional layer would operate in the above-described manner.

One feature of the solid fuel ramjet grain is that it contains multiple layers, segments or sections of fuel with different compositions. The grain is cast with multiple layers although other manufacturing methods may be used. The thrust or burning characteristics of the fuel grain may be altered during combustion by varying the composition of the fuels and by changing the geometry of the fuel layers.

The concentric or multiple layer design allows a wide variation of thrust and combustion characteristics during flight to better optimize range and target acquisition goals. For example, a fuel high in magnesium content cast over a pure hyrdocarbon fuel provides high thrust while the magnesium fuel is burned followed by lower thrust while the pure hydrocarbon fuel is burned. A reversal in fuel layers up allows a reversal in thrust characteristics. Multiple fuel layers utilizing varying fuel compositions and geometric configurations may be configured to provide specific flight profiles. These flight profiles can be varied to optimize the performance of various types of missiles such as air-to-surface, surface-to-air, air-to-air, and surface-to-surface.

Figure 2:
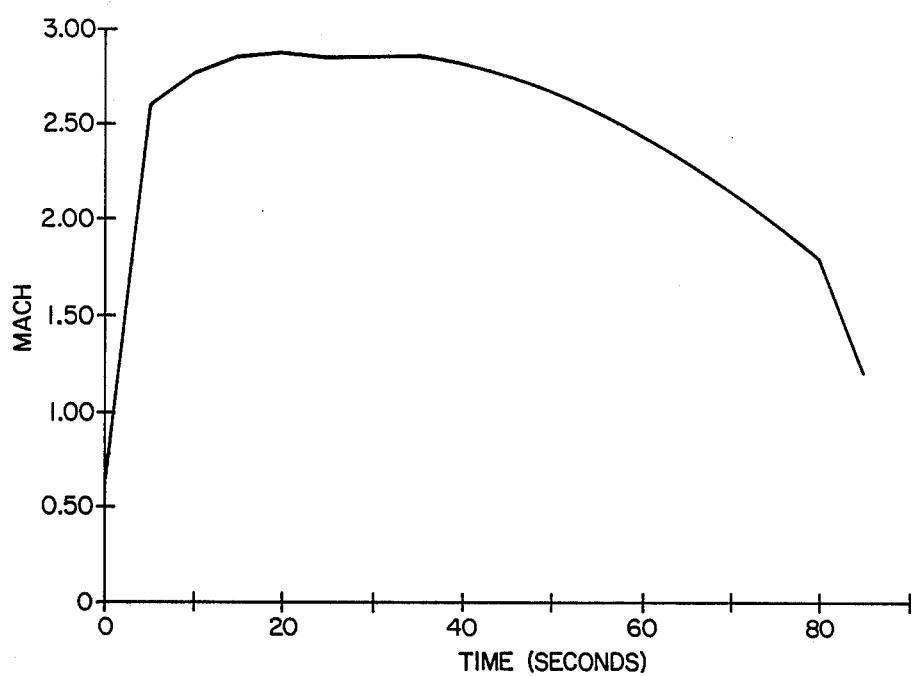
FIG. 2 is a graph of Mach Number vs. Time for a test firing of the multilayer solid fuel ramjet according to the invention.
Figure 3:
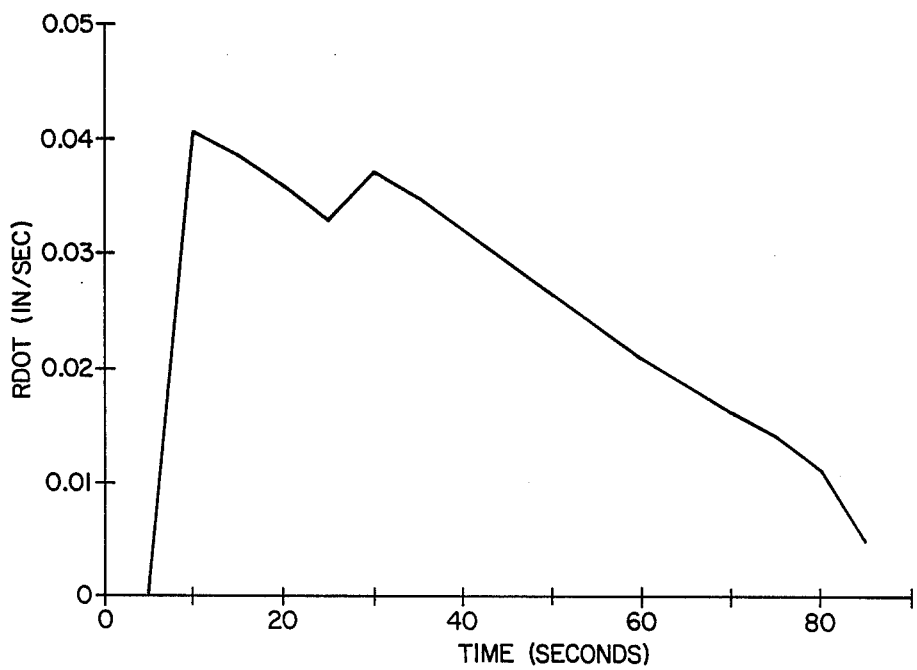
FIG. 3 is a graph of R DOT (regression rate) vs. Time for a test firing of the multilayer solid fuel ramjet according to the invention.

FIGS. 2 and 3 provide an example of the method of controlling the thrust of a solid-fuel ramjet. FIG. 2 is a graph of the Regression Rage (R DOT) vs. Time (seconds). The regression rate is a measure of the burning rate of the solid ramjet fuel and corresponds to the thrust produced by the motor. The initial rise in R DOT is due to the booster propellant. After about 10 seconds, outer fuel layer 4 ignites and the solid fuel motor begins operating as a ramjet. During this time the regression rate slowly decreases. After about 20 seconds inner fuel layer 6 ignites, causing a steady, sustained increase in R DOT before resuming the slow decrease.

FIG. 3 is a corresponding graph of Mach Number vs. Time (seconds). Since the solid fuel ramjet is launched in-flight, it has a measurable Mach No. at time zero. The initial increase in speed to about Mach 2.75 is due to the booster propellant. The speed is maintained at about Mach 2.75 during ignition and burning of outer fuel layer 4. Likewise, the same speed is maintained during ignition and burning of inner fuel layer 6. Constant speed is desirable but difficult to maintain because of rapidly changing variables that affect speed such as weight of the ramjet, drag forces related to angle of attack, and friction forces that vary with altitude and speed.

The solid fuel for the ramjet grain consists of a hydrocarbon fuel in the form of a polymeric binder such as hydroxy-terminated polybutadiene. Additives which can be added to the hydrocarbon fuel to increase the regression rate thereby improving thrust include magnesium, boron carbide ($B_4C$), aluminum and zirconium. These additives are usually in powdered or finely divided form. A range of about 5 to 60 weight percent additives has been found to be effective when mixed with the hydrocarbon fuel.

Modifications and variations of the present invention are possible. It should be understood that, within the scope of the appended claims, the invention may be practiced otherwise than as specifically described.

What is claimed is:

1. A solid fuel ramjet grain comprising a plurality of concentric layers of solid ramjet fuel having a perforation therethrough along the center axis of said grain, said perforation connected to a combustion after-chamber, said solid ramjet fuel layers comprising a pure hydroxyl-terminated polybutadiene hydrocarbon fuel or a mixture of a hydroxyl-terminated polybutadiene hydrocarbon fuel and from about 5 to about 60 percent by weight of an additive to increase the fuel regression rate selected from the group consisting of magnesium, boron carbide, aluminum, and zirconium such that, when burned in the operation of the ramjet, each said fuel layer produces a different level of thrust.

2. A solid fuel ramjet grain as in claim 1 wherein said plurality of concentric layers of solid ramjet fuel with a perforation therethrough along the center axis of said grain has a cross section which defines a geometric shape designed for the efficient burn-off of the solid ramjet fuel to produce thrust.

3. A solid fuel ramjet grain as in claim 1 wherein said solid fuel grain contains an inner core of a solid composite rocket propellant booster charge.

4. A device for controlling the thrust of a solid fuel ramjet comprising a solid fuel ramjet grain having a plurality of concentric layers of solid ramjet fuel with a perforation therethrough along the center axis of said grain, said solid ramjet fuel layers each consisting essentially of a mixture of a polymeric binder and a fuel so that each concentric layer of fuel has a different rate of regression (RDOT) such that the burn-off of each layer of solid ramjet produces a different thrust than the previous layer.

5. A method for controlling the thrust of a solid fuel ramjet, said solid fuel ramjet comprising a plurality of concentric layers of solid ramjet fuel having a perforation therethrough along the center axis of said grain, said perforation connected to a combustion after chamber, said solid ramjet fuel layers consisting essentially of a mixture of a polymeric binder and fuel particles, and said grain has a cross section which defines a geometric shape designed for the efficient burn-off of the solid ramjet fuel to produce thrust, said method comprising:

a. igniting and partially combusting the outermost layer of solid fuel having a particular rate of regression (R DOT), burning at the surface of said fuel layer and in said combustion chamber to produce thrust until the adjacent layer of solid fuel is exposed;

b. partially combusting the adjacent layer of solid fuel having a different rate of regression (R DOT), burning at the surface of said fuel layer and in said combustion afterchamber to produce thrust; and c. repeating steps (a) and (b) until the remaining solid fuel layers have been consumed.

* * * * *